(12) United States Patent
Ishikawa et al.

(10) Patent No.: US 10,598,252 B2
(45) Date of Patent: Mar. 24, 2020

(54) DAMPER DEVICE

(71) Applicant: AISIN SEIKI KABUSHIKI KAISHA, Kariya-shi, Aichi-ken (JP)

(72) Inventors: Yuki Ishikawa, Kariya (JP); Atsushi Yamazumi, Kariya (JP); Yasuyuki Imai, Toyota (JP); Tsuneo Ukei, Toyoake (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 268 days.

(21) Appl. No.: 15/704,985

(22) Filed: Sep. 14, 2017

(65) Prior Publication Data
US 2018/0195577 A1 Jul. 12, 2018

(30) Foreign Application Priority Data

Jan. 10, 2017 (JP) ................................. 2017-001922

(51) Int. Cl.
*F16F 15/123* (2006.01)
(52) U.S. Cl.
CPC .. *F16F 15/12333* (2013.01); *F16F 15/12366* (2013.01); *F16F 2232/02* (2013.01)
(58) Field of Classification Search
CPC ........... F16F 15/12333; F16F 15/12366; F16F 2232/02

USPC ......................... 464/68.8; 192/213.2–213.22
See application file for complete search history.

(56) References Cited

U.S. PATENT DOCUMENTS

| 6,923,725 B2 | 8/2005 | Takeuchi et al. |
| 9,394,982 B2 * | 7/2016 | Mototsune ........ F16F 15/12366 |

FOREIGN PATENT DOCUMENTS

| JP | 4277507 B | 6/2009 |
| JP | 2016-098954 A | 5/2016 |

* cited by examiner

*Primary Examiner* — Greg Binda
(74) *Attorney, Agent, or Firm* — Buchanan Ingersoll & Rooney PC

(57) ABSTRACT

A damper device includes a first rotary element, a second rotary element, and a third rotary element being each rotatable about a rotary center, a first elastic member elastically expanding and contracting in response to a relative rotation of the first rotary element and the second rotary element, a first stopper being provided at the first rotary element and the second rotary element, the first stopper restricting the relative rotation of the first rotary element and the second rotary element by a contact thereof, a second elastic member elastically expanding and contracting in response to a relative rotation of the second rotary element and the third rotary element, and a second stopper being provided at the first rotary element and the third rotary element, the second stopper restricting the relative rotation of the first rotary element and the third rotary element by a contact thereof.

5 Claims, 7 Drawing Sheets

DAMPER DEVICE

CROSS REFERENCE TO RELATED APPLICATIONS

This application is based on and claims priority under 35 U.S.C. § 119 to Japanese Patent Application 2017-001922, filed on Jan. 10, 2017, the entire content of which is incorporated herein by reference.

TECHNICAL FIELD

This disclosure generally relates to a damper device.

BACKGROUND DISCUSSION

A known damper device including a first rotary element, a second rotary element, a third rotary element, a first elastic member, a second elastic member, a first stopper, and a second stopper is disclosed in JP2016-98954A (hereinafter referred to as Patent reference 1). The first to third rotary elements are rotatable about a rotary center. The first elastic member is disposed between the first rotary element and the second rotary element. The second elastic member is disposed between the second rotary element and the third rotary element. The first stopper restricts the first rotary element and the second rotary element from rotating relatively with each other. The second stopper restricts the second rotary element and the third rotary element from rotating relatively with each other.

In the damper device disclosed in Patent reference 1, the first stopper and the second stopper are disposed in series with each other on a power transmission path. Accordingly, in a case where the damper device is mounted on a position where a relatively large load is applied, for example, the relatively large torque acts on the first stopper. Thus, the contact area of the first stopper may be required to be increased, or a harder material may be required to be used.

A need thus exists for a damper device which is not susceptible to the drawback mentioned above.

SUMMARY

According to an aspect of this disclosure, a damper device includes a first rotary element being rotatable about a rotary center, a second rotary element being rotatable about the rotary center, a third rotary element being rotatable about the rotary center, a first elastic member elastically expanding and contracting in response to a relative rotation of the first rotary element and the second rotary element, a first stopper being provided at the first rotary element and the second rotary element, the first stopper restricting the relative rotation of the first rotary element and the second rotary element by the contact thereof, a second elastic member elastically expanding and contracting in response to a relative rotation of the second rotary element and the third rotary element, and a second stopper being provided at the first rotary element and the third rotary element, the second stopper restricting the relative rotation of the first rotary element and the third rotary element by the contact thereof.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
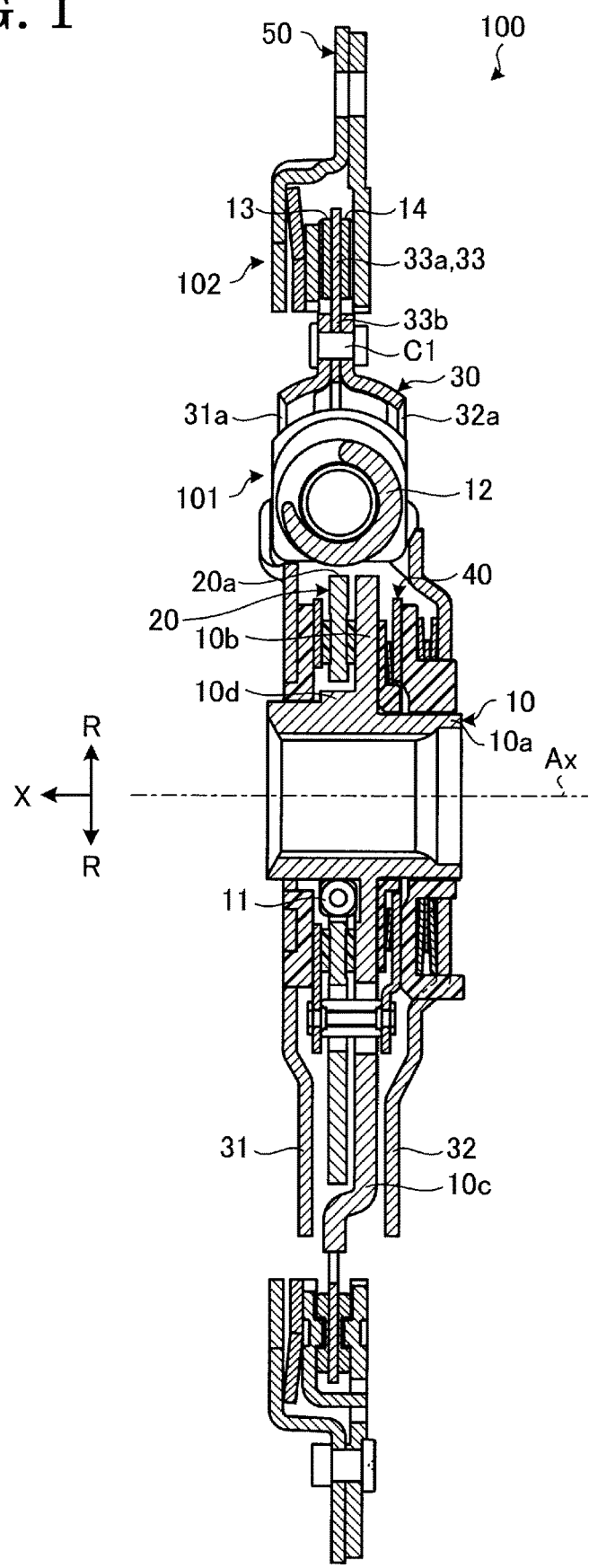
FIG. 1 is an exemplified and schematic cross sectional view of a damper device of a first embodiment disclosed here.

Hereinafter, exemplified embodiments of the disclosure will be disclosed. The configurations of the first and second embodiments described hereunder, the action and result (effect) attained by the configuration are one of examples.

Plural embodiments disclosed hereinafter include same components. Accordingly, hereinafter, the same components are marked with the same reference numerals, and the description of the components will not be repeated. For convenience, directions are defined in each of the figures. X direction is along an axial direction of a rotary axis Ax of a damper device 100. R direction is along a radial direction of the rotary axis Ax. C direction is along a circumferential direction of the rotary axis Ax. The rotary axis Ax is an example of a rotary center.

Ordinal numbers in the specification are used only to distinguish components and materials, and do not indicate a sequential order and a priority.

The damper device 100 of the first embodiment will hereunder be explained. The damper device 100 is disposed between an engine which is provided at an input side, and a transmission which is provided at an output side. The damper device 100 may mitigate the fluctuation of a driving force of, for example, torque and rotation, between the input side and the output side. The damper device 100 may also be called as, for example, a torque fluctuation absorbing device. The damper device 100 is not limited to be positioned between the engine and the transmission, and may be provided between other two rotary elements, for example, the engine and a motor generator. The damper device 100 may be mounted on various vehicles of, for example, a hybrid automobile, and on a machine including a rotary element.

Figure 2:
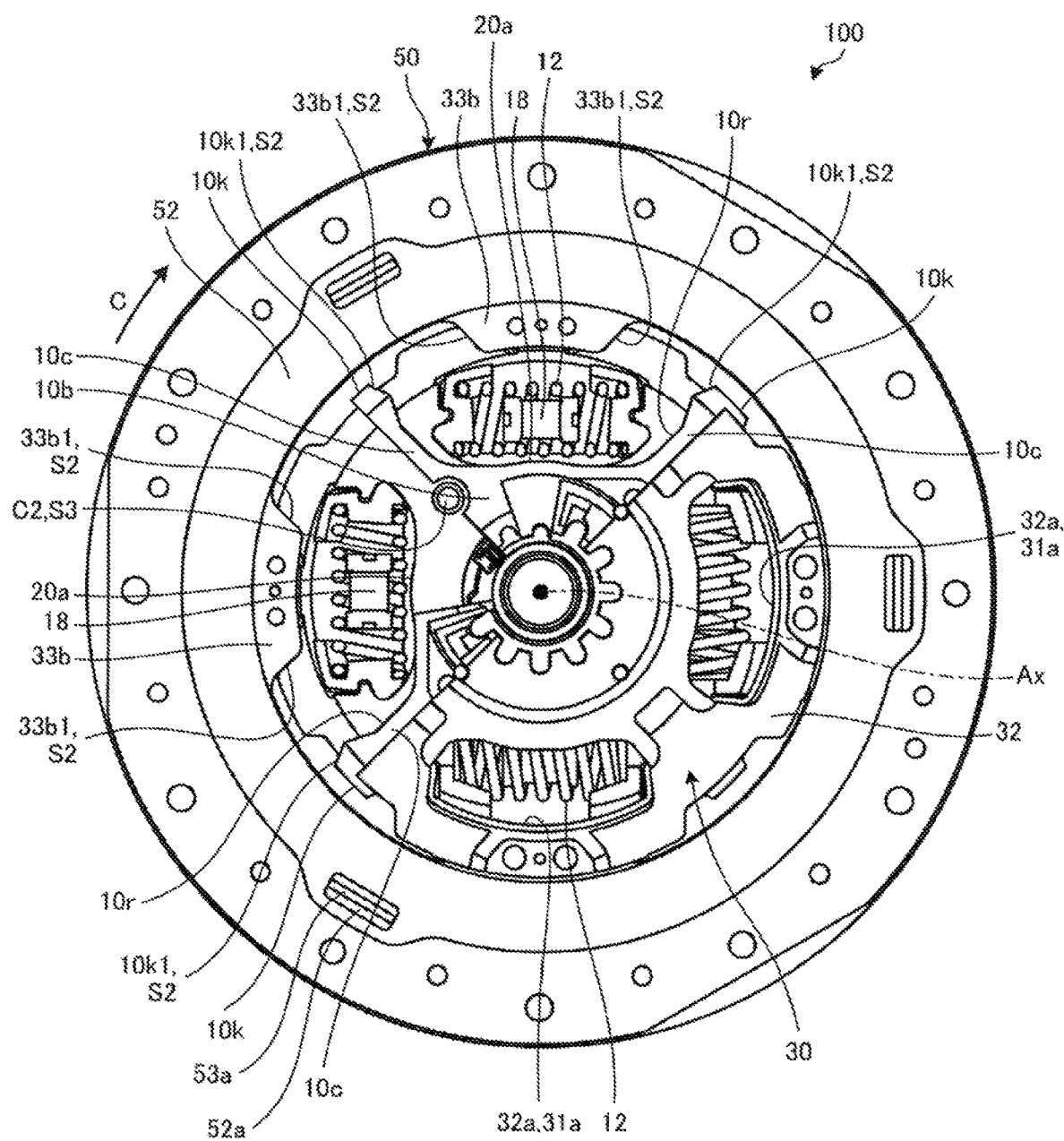
FIG. 2 is an exemplified and schematic front view of the damper device of the first embodiment.

The damper device 100 rotates about the rotary axis Ax. As illustrated in FIGS. 1 and 2, as a whole, the damper device 100 is formed in a flat disc shape being thin in the axial direction.

The damper device 100 includes a damper portion 101 and a limiter portion 102. The damper portion 101 is disposed inward of the limiter portion 102 in the radial direction.

The damper portion 101 is provided with, for example, a first center plate 10, a second center plate 20, a side plate 30, a control plate 40, an inner coil spring 11, and an outer coil spring 12. The first center plate 10 is an example of a first rotary element, the second center plate 20 is an example of a second rotary element, the side plate 30 is an example of a third rotary element, and the control plate 40 is an example of a fourth rotary element. The inner coil spring 11 is an example of a first elastic member, and the outer coil spring 12 is an example of a second elastic member.

The first center plate 10, the second center plate 20, the side plate 30, and the control plate 40 are provided so as to be rotatable about the rotary axis Ax.

As illustrated in FIG. 1, the first center plate 10 includes a hub 10a being formed in a cylindrical shape, and a flange plate 10b extending radially outward from the hub 10a. The first center plate 10 may also be called as, for example, a first hub plate, a first hub member, or an inner hub.

The hub 10a is provided so as to surround an input shaft of the transmission. The hub 10a is combined with the input shaft of the transmission by a spline fitting, and integrally rotates therewith. The hub 10a is an example of a cylindrical portion.

The flange plate 10b is formed in a substantially ring shape and in a plate shape extending, or widening along the radial direction. The flange plate 10b is disposed inward relative to the outer coil spring 12 in the radial direction.

The first center plate 10 includes four arms 10c extending radially outward from the flange plate 10b, one of which is visible in FIG. 1. As illustrated in FIG. 2, each arm 10c extends radially outward from the hub 10a by passing between the two outer coil springs 12. In other words, the four arms 10c are provided so as to be spaced from one another by, for example, 90 degrees about the rotary axis Ax, and each of clearances 10r between two arms 10c that are adjacent to each other in the circumferential direction is provided with the outer coil spring 12. Each arm 10c is overlapped with the second center plate 20 in the axial direction by having a clearance therebetween. The number of the arms 10c is not limited to, for example, four.

Figure 4:
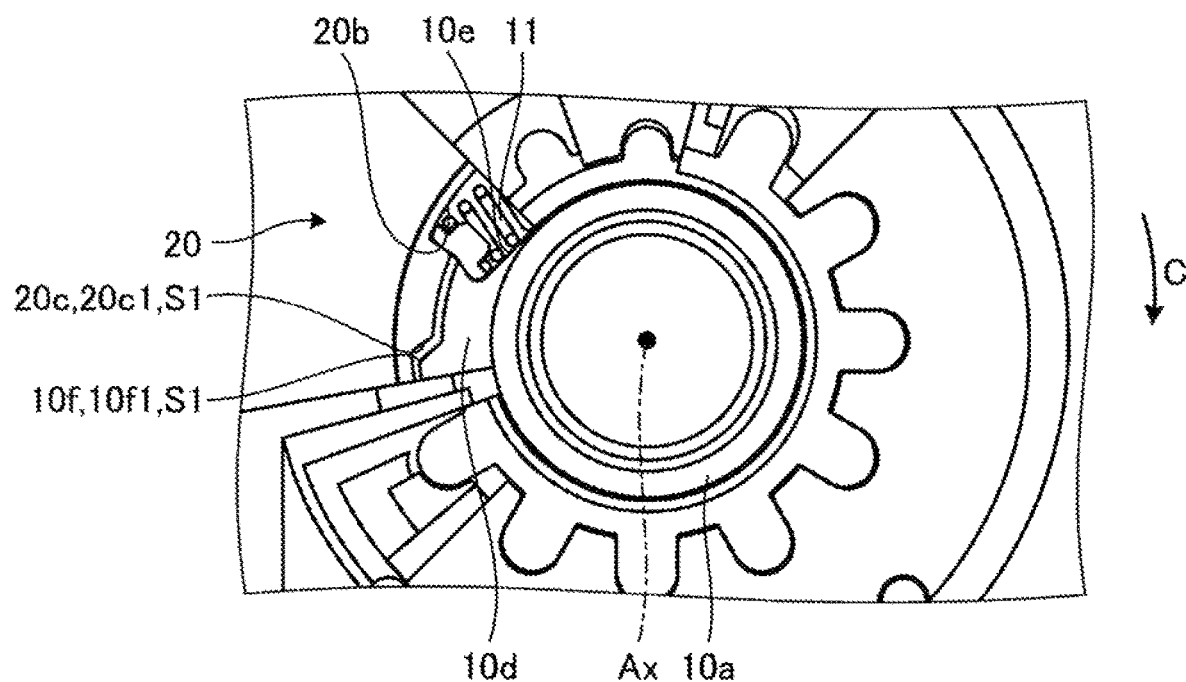
FIG. 4 is an enlarged view of a part in FIG. 2.

As illustrated in FIG. 1, the first center plate 10 is provided with a base 10d extending radially outward from a position displaced from the flange plate 10b of the hub 10a in the axial direction (a left position of the flange plate 10b in FIG. 1). As illustrated in FIG. 4, the base 10d is provided with a recess 10e recessed radially inward from an outer rim of the base 10d.

In the recess 10e, the inner coil spring 11 extending substantially along the circumferential direction or a contact line direction over a first rim portion and a second rim portion in the circumferential direction of the recess 10e. In the first embodiment, for example, the two recesses 10e are provided by having a space therebetween by, for example, 180 degrees about the rotary axis Ax, and the inner coil spring 11 is disposed at each of the recesses 10e. Meanwhile, the number of recess 10e and the inner coil spring 11 is not limited to, for example, two.

The base 10d is provided with a protrusion 10f protruding radially outward from a position displaced from the recessed portion 10e in the circumferential direction. A contact portion 10f1 facing the second center plate 20 is provided at each of end portions of the protrusion 10f in the circumferential direction.

As shown in FIGS. 1 and 2, the second center plate 20 is formed in the ring shape and in the plate shape extending, or widening along the radial direction. The second center plate 20 is disposed so as to have a clearance relative to the flange plate 10b in the axial direction, and is disposed so as to have a clearance at an outward of the base 10d in the radial direction. The second center plate 20 may transmit the rotation (torque) between the first center plate 10 and the side plate 30. The second center plate 20 may also be called as, for example, a second hub plate, a second hub member, and an outer hub.

The second center plate 20 is provided with four opening portions 20a, two of which are labeled in FIG. 2, being provided so as to include a space therebetween by, for example, 90 degree about the rotary axis A. The outer coil spring 12 is disposed over a first rim portion and a second rim portion in the circumferential direction of the opening portion 20a. The opening portion 20a is disposed next to a clearance 10r of the first center plate 10 in the axial direction. A width of the opening portion 20a along the circumferential direction is smaller than a width of the clearance 10r along the circumferential direction.

Plural recesses 20b, 20c recessed outward in the radial direction, one of each of which is shown in FIG. 4, are provided at an inner circumferential portion of the second center plate 20. Each recess 20b is disposed at a position corresponding to a recess 10e. The inner coil spring 11 is provided over the first rim portion and the second rim portion of the recess 20b in the circumferential direction.

The recess 20c is disposed at a position of the inner circumferential portion of the second center plate 20, the position displaced in the circumferential direction relative to the recess 20b. The recess 20c is disposed at a position corresponding to the protrusion 10f, and contains at least a part of the protrusion 10f. Each of rim portions of the recessed portion 20c in the circumferential direction is provided with a contact portion 20c1 facing the contact portion 10f1.

The inner coil spring 11 is contained in the recess 10e and the recess 20b facing with each other in the radial direction. In such a configuration, when the first rim portion of the recess 10e in the circumferential direction and the second rim portion of the recess 20b in the circumferential direction relatively rotate with each other so as to be close to each other, the inner coil spring 11 elastically contracts by the first and second rim portions. On the other hand, when the first rim portion of the recess 10e in the circumferential direction and the second rim portion of the recess 20b in the circumferential direction relatively rotate with each other so as to be away from each other in a state where the inner coil spring 11 elastically contracts in the recess 10e and the recess 20b, the inner coil spring 11 elastically expands.

As such, the inner coil spring 11 is disposed between the first center plate 10 and the second center plate 20, and elastically expands and contracts in the circumferential direction in response to the relative rotation of the first center plate 10 and the second center plate 20. The inner coil spring 11 accumulates the torque as a compression force by elastically contracting, and discharges the compression force as a torque by elastically expanding. The damper portion 101 may mitigate the torque fluctuation by the expansion and the contraction of the inner coil spring 11.

The relative rotation of the first center plate 10 and the second center plate 20 is limited within a predetermined angle range by the contact of the contact portion 10f1 and the contact portion 20c1. Accordingly, the inner coil spring 11 is inhibited from contracting excessively. The contact portion 10f1 and the contact portion 20c1 are examples of a first stopper S1.

Figure 3:
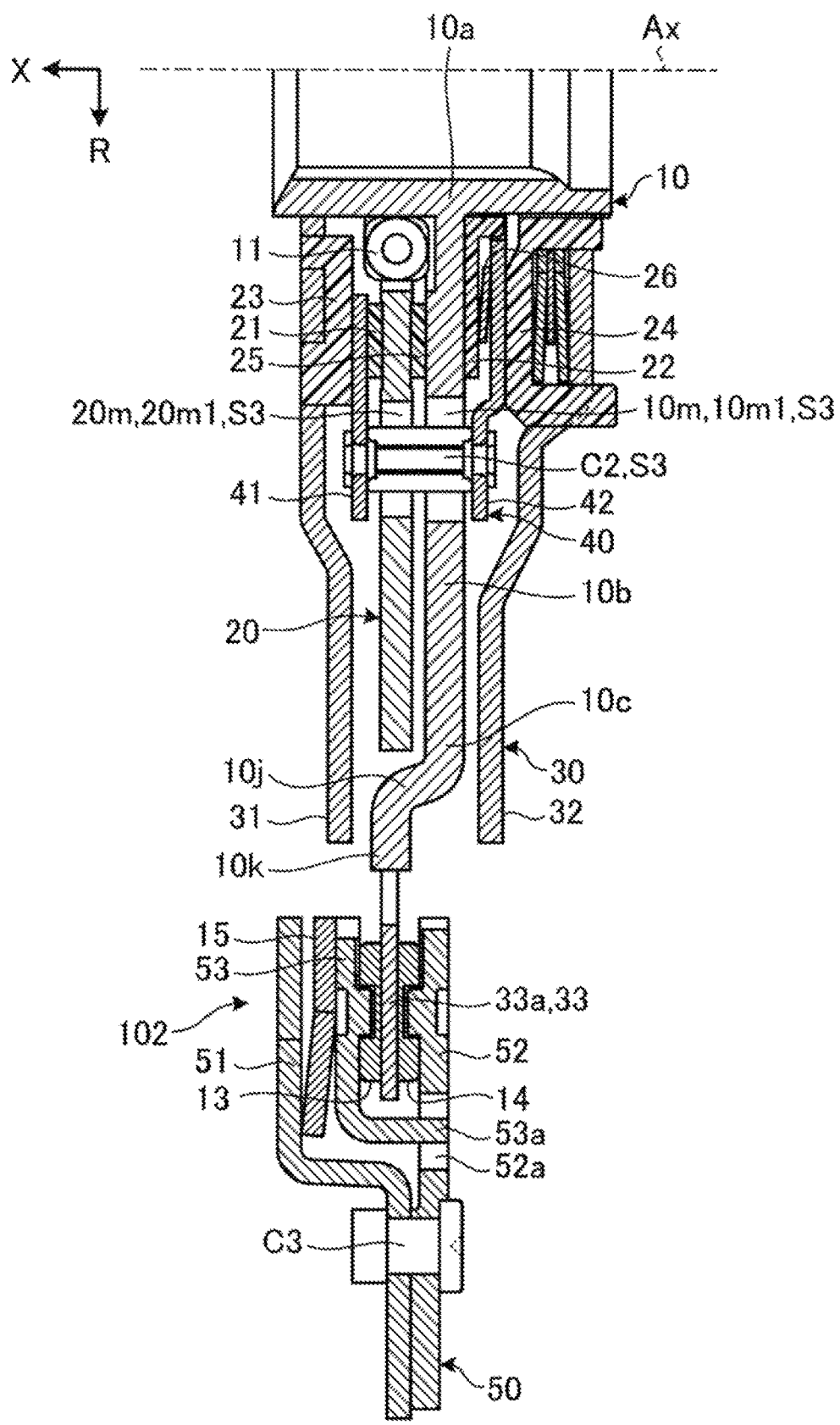
FIG. 3 is an enlarged view of a part in FIG. 1.

As illustrated in FIG. 3, the side plate 30 includes, for example, a first side plate 31, a second side plate 32, and a ring plate 33.

The first side plate 31 and the second side plate 32 are formed in the ring shape and in the plate shape extending, or widening along the radial direction. Each inner part of the first side plate 31 and the second side plate 32 in the radial direction is spaced apart from each other in the axial direction, and each outer part of the first side plate 31 and the second side plate 32 in the radial direction is coupled with each other by a coupler C1 of, for example, a rivet illustrated in FIG. 1.

As illustrated in FIGS. 1 and 2, the first side plate 31 and the second side plate 32 are provided with opening portions 31a, 32a, respectively. The opening portions 31a, 32a are disposed at positions corresponding to the opening portion 20a. In other words, the opening portions 31a, 32a, and the opening portion 20a are disposed in a row in the axial direction. The outer coil spring 12 is disposed over a first rim portion and a second rim portion of each of the opening portions 31a, 32a in the circumferential direction.

As illustrated in FIG. 1, the ring plate 33 includes the ring-shaped and plate shaped annular portion 33a extending, or widening along the radial direction, and an inward flange 33b protruding radially inward from the annular portion 33a. The annular portion 33a is sandwiched between a first friction member 13 and a second friction member 14 of the limiter portion 102. The inward flange 33b is coupled with the first side plate 31 and the second side plate 32 by the coupler C of, for example, the rivet. Thus, the ring plate 33 integrally rotates with the first side plate 31 and the second side plate 32 about the rotary axis Ax.

As illustrated in FIG. 2, opposing end portions of the inward flange 33b in the circumferential direction are provided with contact portions 33b1 facing the arms 10c, respectively. In the first embodiment, for example, the four inward flanges 33b are provided so as to be spaced apart from one another in the circumferential direction. The inner flange 33b is an example of a protrusion.

As illustrated in FIG. 3, an outer end portion of the arm 10c in the radial direction is bent in a crank shape. That is, the arm 10c includes an inclination portion 10j and an extending portion 10k. The inclination portion 10j is bent to the left in FIG. 3 from a position close to a distal end portion, and goes outward in the radial direction as being towards the left. The extending portion 10k is bent radially outward from the inclination portion 10j and extending outward in the radial direction.

The extending portion 10k is lined with the second center plate 20 and the annular portion 33a in the radial direction, and is overlapped with the inward flange 33b in the circumferential direction. As illustrated in FIG. 2, opposing end portions of the extending portion 10k in the circumferential direction are provided with contact portions 10k1 facing the contact portions 33b1, respectively.

The outer coil spring 12 is contained in the opening portion 20a, and the opening portions 31a, 32a that are overlapped with one another in the axial direction. In such a configuration, when the first rim portion of the opening portion 20a in the circumferential direction and respective second rim portions of the opening portion 31a and the opening portion 32a in the circumferential direction relatively rotate with each other so as to be close to one other, the outer coil spring 12 elastically contracts by the first and second rim portions. On the other hand, when the first rim portion of the opening portion 20a in the circumferential direction and the respective second rim portions of the opening portion 31a and the opening portion 32a in the circumferential direction relatively rotate with one another so as to be away from one another in a state where the outer coil spring 12 elastically contracts in the opening portion 20a, the opening portion 31a and the opening portion 32a, the outer coil spring 12 elastically expands.

As such, the outer coil spring 12 is disposed between the second center plate 20 and the side plate 30, and elastically expands and contracts in response to the relative rotation of the second center plate 20 and the side plate 30. The outer coil spring 12 accumulates the torque as a compression force by elastically contracting, and discharges the compression force as a torque by elastically expanding. The damper portion 101 may mitigate the torque fluctuation by the expansion and the contraction of the outer coil spring 12.

A cushion member 18 acting as an elastic member is contained within the coil of the outer coil spring 12. The cushion member 18 also acts as the second elastic member.

The relative rotation of the first center plate 10, the second center plate 20, and the side plate 30 is limited within a predetermined angle range by the contact of the contact portion 10k1 and the contact portion 33b1. Accordingly, the outer coil spring 12 and the cushion member 18 are inhibited from contracting excessively. The contact portion 10k1 and the contact portion 33b1 are examples of a second stopper S2.

As described above, in the first embodiment, the first stopper S1 inhibits the first center plate 10 and the second center plate 20 from relatively rotating with each other. The second stopper S2 inhibits the first center plate 10 and the side plate 30 from relatively rotating with each other. That is, in the first embodiment, the first stopper S1 and the second stopper S2 are disposed parallel to each other in the power transmission path of the damper device 100.

As illustrated in FIG. 3, the control plate 40 includes, for example, a first control plate 41 and a second control plate 42. The first control plate 41 and the second control plate 42 are disposed so as to be spaced from each other in the axial direction. The first control plate 41 and the second control plate 42 are formed in the ring shape and in the plate shape extending, or widening along the radial direction.

The first control plate 41 is disposed between the first side plate 31 and the second center plate 20 in the axial direction. The second control plate 42 is disposed between the second side plate 32 and the first center plate 10 in the axial direction. The first control plate 41 and the second control plate 42 are coupled with each other by a coupler C2 of, for example, a rivet. Accordingly, the first control plate 41 and the second control plate 42 integrally rotate with each other about the rotary axis Ax.

The coupler C2 passes through opening portions 10m, 20m that are provided at the first center plate 10 and the second center plate 20, respectively, in the axial direction. The control plate 40 is provided so as to be relatively rotatable with the first center plate 10 and the second center plate 20. However, the relative rotation of the control plate 40, and the first center plate 10 and the second center plate 20 are limited within a predetermined angle range by the contact of the coupler C2 and end portions 10m1, 20m1 of the opening portions 10m, 20m, respectively, in the circumferential direction. The coupler C2 is an example of a slider. The coupler C2 and the end portions 10m1, 20m1 are examples of a third stopper S3.

A first sliding member 21 is sandwiched between the second center plate 20 and the first control plate 41. The first sliding member 21 slides in the circumferential direction with at least one of the second center plate 20 and the first control plate 41 in response to the relative rotation of the second center plate 20 and the first control plate 41.

A first sliding member 22 is disposed between the first center plate 10 and the second control plate 42. The first sliding member 22 slides with the first center plate 10 in the circumferential direction in response to the relative rotation of the first center plate 10 and the control plate 40.

A first plate spring 26 is disposed between the first sliding member 22 and the second control plate 42. The first plate spring 26 applies the elastic force to the first sliding member 22 and the second control plate 42 in a direction away from each other in the axial direction. Accordingly, the sliding resistance is applied to the first sliding members 21, 22, second sliding members 23, 24, and a third sliding member 25.

The second sliding member 23 is disposed between the first side plate 31 and the first control plate 41. The second sliding member 23 integrally rotates with the first side plate 31, and slides with the first control plate 41 in the circumferential direction in response to the relative rotation of the side plate 30 and the control plate 40.

The second sliding member 24 is disposed between the second side plate 32 and the second control plate 42. The second sliding member 24 integrally rotates with the second side plate 32, and slides with the second control plate 42 in the circumferential direction in response to the relative rotation of the side plate 30 and the control plate 40.

The third sliding member 25 is sandwiched between the first center plate 10 and the second center plate 20. The third sliding member 25 slides with at least one of the first center plate 10 and the second center plate 20 in the circumferential direction in response to the relative rotation of the first center plate 10 and the second center plate 20.

An outer plate 50 is rotatably provided about the rotary axis Ax. As illustrated in FIG. 3, the outer plate 50 includes, for example, a cover plate 51, a support plate 52, and a pressure plate 53. The cover plate 51 and the support plate 52 are disposed so as to be away from each other in the axial direction. The pressure plate 53 is disposed between the cover plate 51 and the support plate 52.

The cover plate 51 and the support plate 52 are coupled with each other by a coupler C3 of, for example, a rivet. The pressure plate 53 is provided with a hook portion 53a that is hooked with an opening portion 52a provided at the support plate 52 in the circumferential direction. Accordingly, the cover plate 51, the support plate 52, and the pressure plate 53 integrally rotate with one another about the rotary axis Ax.

As illustrated in FIGS. 1 to 3, the limiter portion 102 is disposed outward of the damper portion 101 in the radial direction. The limiter portion 102 includes, for example, the cover plate 51, a second plate spring 15, the pressure plate 53, the first friction member 13, the ring plate 33, the second friction member 14, and the support plate 52 in order from the left to the right in FIG. 3. The cover plate 51, the second plate spring 15, the pressure plate 53, the first friction member 13, the ring plate 33, the second friction member 14, and the support plate 52 are overlapped with one another in the axial direction in a state of being close contact with one another.

In the limiter portion 102, in a state where the damper portion 101 and the opposite side of the limiter portion 102 relative to the damper portion 101 include a difference in torque that is smaller than a threshold value within a setting range, the limiter portion 102 does not generate a slippage by the elastic pressure force of the second plate spring 15, and the damper portion 101 and the limiter portion 102 constituting the damper device 100 integrally rotate with each other. In other words, in a state where the damper portion 101 and the opposite side of the limiter portion 102 relative to the damper portion 101 include the difference in torque that is greater than the threshold value, the limiter portion 102 generates the slippage that is greater than the frictional force by the elastic pressure force of the second plate spring 15. As such, the limiter portion 102 acts as a torque limiter, and inhibits the transmission of the torque that is greater than the setting value.

Figure 5:
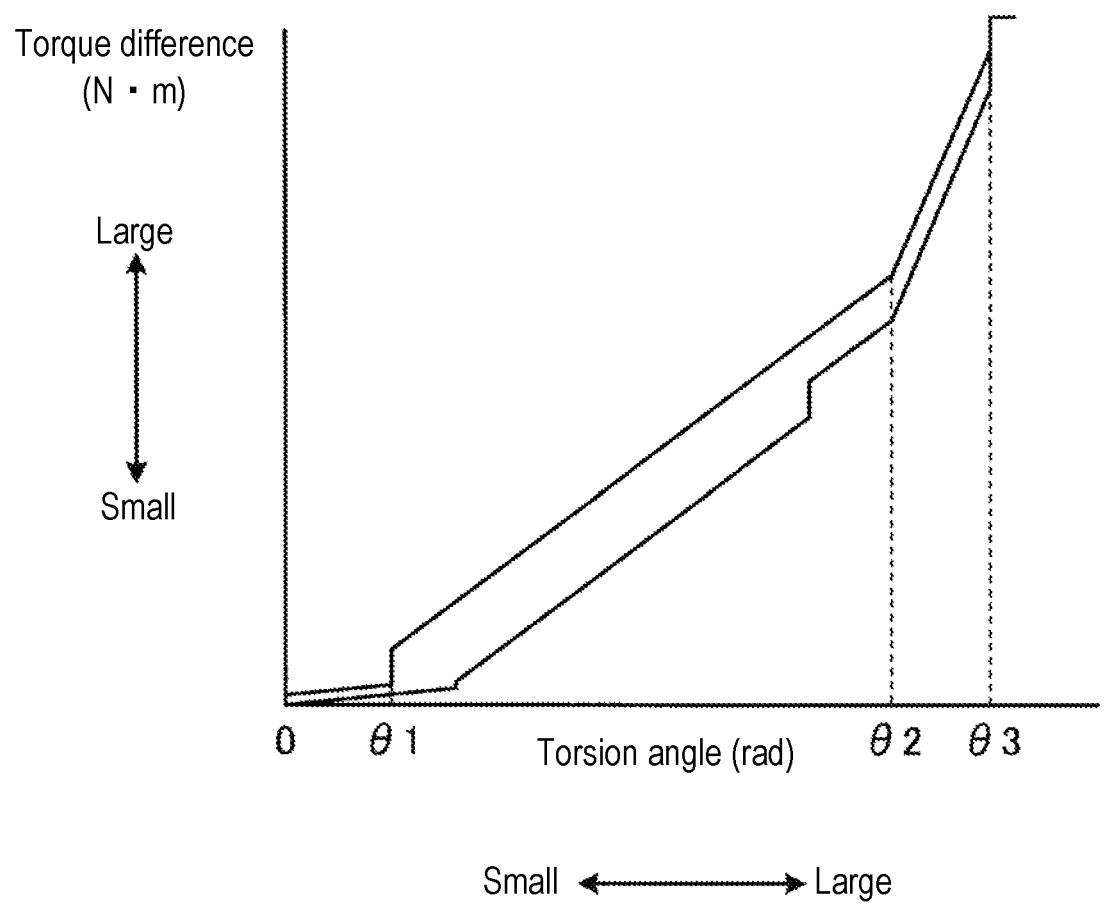
FIG. 5 is an exemplified and schematic characteristic graph illustrating a relationship between a relative torsion angle (angle difference) and a torque (torque difference) between a first rotary element and a third rotary element of the damper device of the first embodiment.

In FIG. 5, the relation between a torsion angle and the torque difference of the input side and the output side is illustrated as an example. The torsion angle may also be referred to as an angle difference. A lateral axis of a characteristic graph shown in FIG. 5 corresponds to a torsion angle, and a longitudinal axis of the characteristic graph shown in FIG. 5 corresponds to a torque difference. The lateral axis in FIG. 5 corresponds to a rotary angle of the first center plate 10 relative to the side plate 30. In FIG. 5, a rotary angle of a first direction (C direction) of the first center plate 10 relative to the side plate 30 is larger towards the right of the lateral axis. The longitudinal axis in FIG. 5 corresponds to a relative torque difference of the first center plate 10 relative to the side plate 30. In FIG. 5, the torque difference of the first direction (C direction) is greater towards the upper of the longitudinal axis.

When the torsion angle $\theta$ increases from zero degree, the contact portion $10l1$ and the contact portion $20c1$ of the first stopper S1 come in contact with each other at a torsion angle $\theta 1$, and the relative rotation of the first center plate 10 and the second center plate 20 is limited. In addition, the coupler C2 and the end portions $10m1$, $20m1$ of the third stopper S3 restrict the relative rotation of the first center plate 10, the second center plate 20, and the control plate 40 at the torsion angle $\theta 1$ or in the vicinity thereof. In the first embodiment, because the change rate of the torque difference relative to the torsion angle at a section from zero of the torsion angle $\theta$ to $\theta 1$ (and a section from zero of the torsion angle $\theta$ to $-\theta 1$) depends on a spring constant of the inner coil spring 11, the change rate of the torque difference can be set smaller than a section where the torsion angle $\theta$ is greater than $\theta 1$. In other words, the specifications of positions (moment arm), the spring constants, and Young's modulus of the inner coil spring 11, the outer coil spring 12, and the cushion member 18 may be set to be able to include an inclination shown in FIG. 5. Accordingly, because an impact load acting on contact surfaces of the input shaft of the transmission and the hub $10a$ may be set to be decreased in a case where a size of a clearance at the fitting portions (the spline fitting portions) of the input shaft and the fitting portion decreases, noises and vibration may be decreased.

In a case where the torsion angle $\theta$ increases from $\theta 1$, the change rate of the torque difference relative to the torsion angle increases because the cushion member 18 starts compressing at the torsion angle $\theta 2$. Furthermore, in a torsion angle $\theta 3$, the contact portion $10k1$ and the contact portion $33b1$ of the second stopper S2 come in contact with each other to restrict the relative rotation of the first center plate 10, the second center plate and side plate 30.

As above, in the first embodiment, for example, the damper device 100 includes the first stopper S1 and the second stopper S2. The first stopper S1 is provided at the first center plate 10 and the second center plate 20 and restricts the relative rotation of the first center plate 10 and the second center plate 20 by the contact thereof. The second stopper S2 is provided at the first center plate 10 and the side plate 30, and restricts the relative rotation of the first center plate 10 and the side plate 30 by the contact thereof. According to the configuration, for example, the first stopper S1 and the second stopper S2 may be disposed in parallel to each other at the power transmission path of the damper device 100. Accordingly, for example, even in a case where the damper device 100 is disposed at a position where a relatively large load acts on, the load torque acting on the first stopper S1 may be decreased.

In the first embodiment, for example, the second stopper S2 is disposed outward relative to the first stopper S1 in the radial direction. Accordingly, according to the first embodiment, for example, because the length of the moment arm of the second stopper S2 may be increased, the load (surface pressure) acting on the second stopper S2 by the load torque may be decreased.

In the first embodiment, for example, the first center plate 10 includes the hub 10a and the arm 10c extending outward from the hub 10a in the radial direction. The side plate 30 includes the annular portion 33a and the inward flange 33b protruding inward from the annular portion 33a in the radial direction. The second stopper S2 is provided at the arm 10c and the inward flange 33b. According to the aforementioned configuration, for example, in the configuration in which the first center plate 10 includes the hub 10a and the side plate 30 includes the annular portion 33a, the second stopper S2 may include relatively simple structure.

Figure 6:
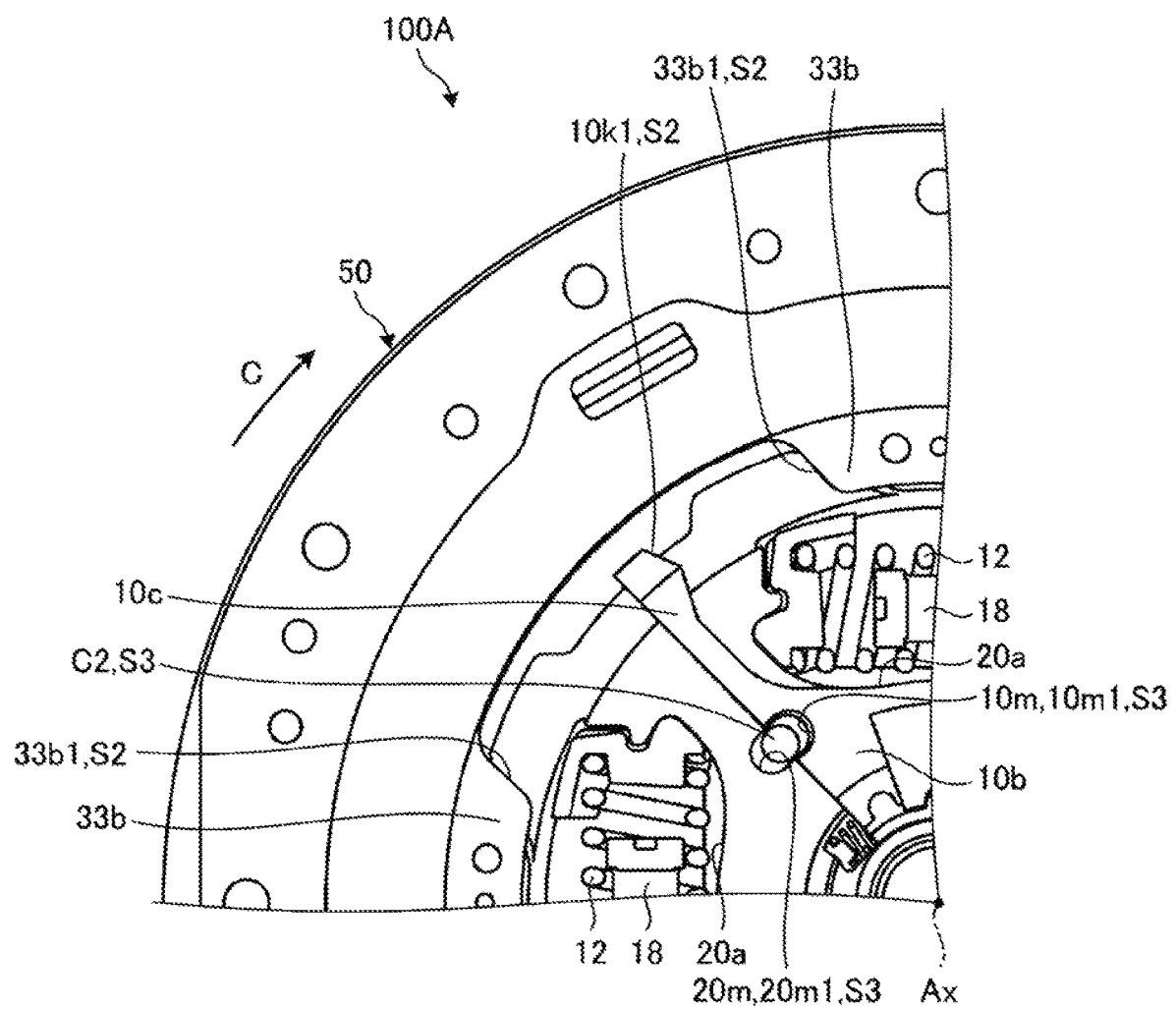
FIG. 6 is an exemplified and schematic front view of a part of a damper device of a second embodiment.

A second embodiment of the disclosure will hereunder be explained. A damper device 100A of the second embodiment illustrated in FIGS. 6 and 7 includes the same configuration as that of the damper device 100 of the first embodiment. Thus, in the second embodiment, the same result (effect) based on the same configuration as the first embodiment will be obtained.

However, in the second embodiment, opening portions 10m, 20m provided at the first center plate 10 and the second center plate 20 are configured as an arc-shaped elongated hole extending along the circumferential direction, which is different from the first embodiment.

Moreover, a clearance between the contact portion 10f1 and the contact portion 20c1 of the first stopper S1 in the circumferential direction is configured so as to be greater in size than that of the aforementioned first embodiment. In the second embodiment as well, in a torsion angle θ11, the contact portion 10f1 and the contact portion 20c1 restrict the relative rotation of the first center plate 10 and the second center plate 20, and the coupler C2 and the end portions 10m1, 10m2 of the third stopper S3 restrict the relative rotation of the first center plate 10, the second center plate 20 and the control plate 40 at the same angle as the torsion angle θ1 or in the vicinity thereof.

Figure 7:
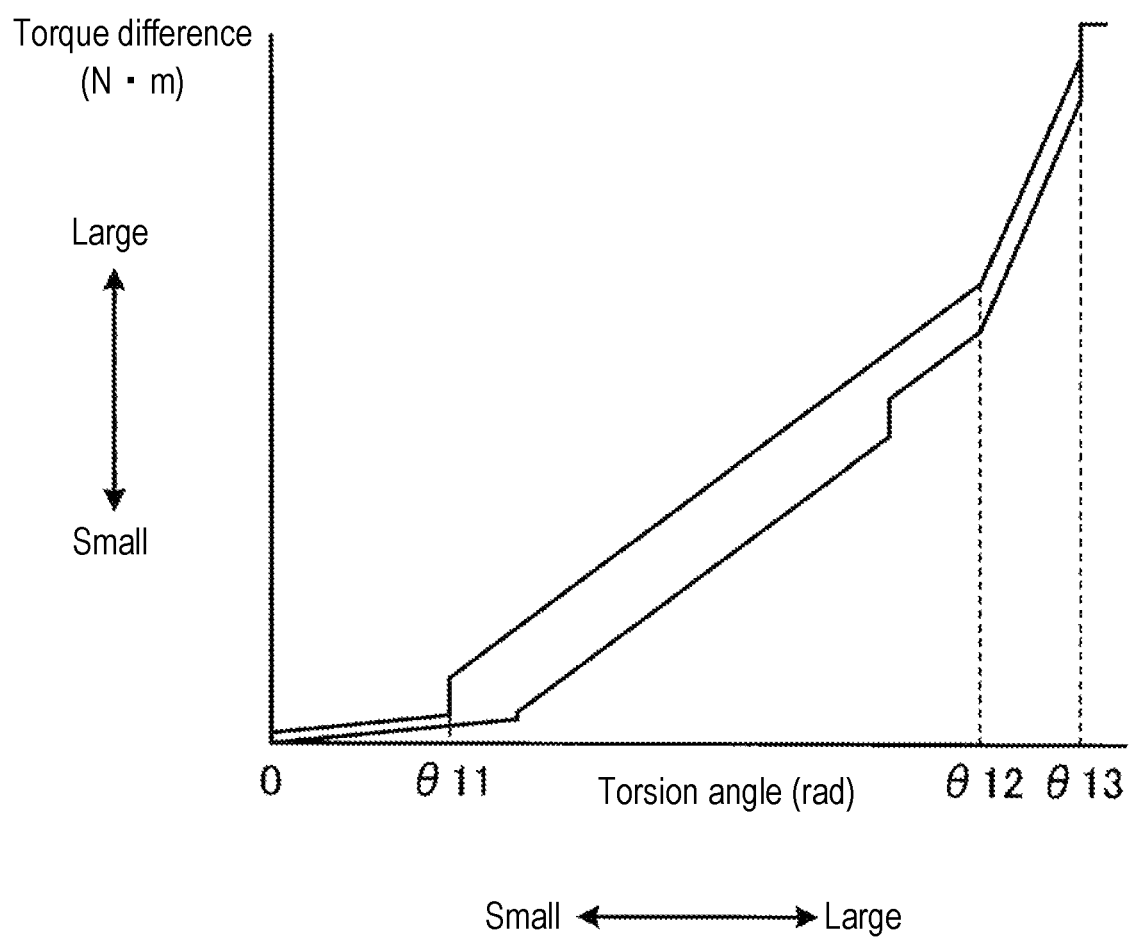
FIG. 7 is an exemplified and schematic characteristic graph illustrating a relationship between a relative torsion angle (angle difference) and a torque (torque difference) between a first rotary element and a third rotary element of the damper device of the second embodiment.

Accordingly, as illustrated in FIG. 7, an angle in which the contact portion 10f1 and the contact portion 20c1 of the first stopper S1 come in contact with each other, that is, the torsion angle θ11, may be larger than that of the aforementioned first embodiment.

According to the configuration, because the impact load acting on the contact surfaces of the input shaft of the transmission and the hub 10a may be set smaller than the aforementioned first embodiment in a case where the size of the clearance at the fitting portions (the spline fitting portions) of the input shaft and the fitting portion decreases, the noise and vibration may be further decreased. The torsion angles θ1, θ11 are an example of the first angle, the torsion angles θ2, θ12 are an example of the second angle, and the torsion angles θ3, θ13 are an example of the third angle. The torsion angles θ2, θ12 are greater than the torsion angles θ1, θ11, and are smaller than the torsion angles θ3, θ13.

According to the aforementioned embodiment, the damper device 100, 100A includes the first center plate 10 (the first rotary element) being rotatable about the rotary axis Ax (the rotary center), the second center plate 20 (the second rotary element) being rotatable about the rotary axis Ax (the rotary center), the side plate 30 (the third rotary element) being rotatable about the rotary axis Ax (the rotary center), the inner coil spring 11 (the first elastic member) elastically expanding and contracting in response to the relative rotation of the first center plate 10 (the first rotary element) and the second center plate 20 (the second rotary element), the first stopper S1, 10f1, 20c1 being provided at the first center plate 10 (the first rotary element) and the second center plate 20 (the second rotary element), the first stopper S1 (the contact portion 10f1, the contact portion 20c1) restricting the relative rotation of the first center plate 10 (the first rotary element) and the second center plate 20 (the second rotary element) by the contact thereof, the outer coil spring 12 (the second elastic member) elastically expanding and contracting in response to the relative rotation of the second center plate 20 (the second rotary element) and the side plate 30 (the third rotary element), and the second stopper S2 (the contact portion 10k1, the contact portion 33b1) being provided at the first center plate 10 (the first rotary element) and the third rotary element, the second stopper restricting the relative rotation of the first rotary element and the side plate 30 (the third rotary element) by the contact thereof.

According to the configuration, the first stopper S1 (the contact portion 10f1, the contact portion 20c1) and the second stopper S2 (the contact portion 10k1, the contact portion 33b1) may be disposed in parallel to each other in the power transmission path. Thus, even in a case where the damper device 100, 100A is disposed at the position where the relatively large load acts on, the load torque acting on the first stopper S1 (the contact portion 10f1, the contact portion 20c1) may be reduced.

According to the aforementioned embodiment, the second stopper S2 (the contact portion 10k1, the contact portion 33b1) is disposed radially outward of the rotary axis Ax (the rotary center) relative to the first stopper S1 (the contact portion 10f1, the contact portion 20c1).

According to the configuration, because the length of the moment arm of the second stopper S2 (the contact portion 10k1, the contact portion 33b1) may be increased, the load (surface pressure) acting on the second stopper S2 (the contact portion 10k1, the contact portion 33b1) by the load torque may be reduced.

According to the aforementioned embodiment, the first center plate 10 (the first rotary element) includes the hub 101 (the cylindrical portion) and the arm 10c extending radially outward from the hub 101 (the cylindrical portion). The side plate 30 (the third rotary element) includes the annular portion 33a and the inward flange 33b (the protrusion) protruding radially inward from the annular portion 33a. The second stopper S2 (the contact portion 10k1, the contact portion 33b1) is provided at each of the arm 10c of the first center plate 10 (the first rotary element) and the inward flange 33b (the protrusion) of the side plate 30 (the third rotary element).

According to the configuration, the second stopper S2 (the contact portion 10k1) may include a relatively simple structure with a configuration in which the first center plate 10 (the first rotary element) includes the hub 10a (the cylindrical portion) and the side plate 30 (the third rotary element) includes the annular portion 33a.

The damper device 100A further includes the control plate 40 (the fourth rotary element) being rotatable about the rotary axis Ax (the rotary center), the first sliding member 21, 22 sliding in the circumferential direction of the rotary axis Ax (the rotary center) between, at least one of the first center plate 10 (the first rotary element) and the second center plate 20 (the second rotary element), and the control plate 40 (the fourth rotary element), the second sliding member 23, 24 sliding in the circumferential direction between the side plate 30 (the third rotary element) and the control plate 40 (the fourth rotary element), and the third stopper S3 (the end portion 10m1, the end portion 20m1, the coupler C2) being provided at least one of the first center plate 10 (the first rotary element) and the second center plate 20 (the second rotary element), the third stopper S3 (the end portion 10m1, the end portion 20m1, the coupler C2) being provided at the control plate 40 (the fourth rotary element), the third stopper S3 (the end portion 10m1, the end portion 20m1, the coupler C2) restricting the relative rotation of, at least one of the first center plate 10 (the first rotary element) and the second center plate 20 (the second rotary element), and the control plate 40 (the fourth rotary element) by the contact thereof. The third stopper S3 (the end portion 10m1, the end portion 20m1, the coupler C2) includes the end portion 10m1, 20m1 in the circumferential direction, the end portion 10m1, 20m1 of the arc-shaped elongated hole 10m, 20m that is along the circumferential direction, the arc-shaped elongated hole 10m, 20m being provided at least at one of the first center plate 10 (the first rotary element) and the second center plate 20 (the second rotary element), and the coupler C2 (the slider) being inserted into the elongated hole 10m, 20m, the coupler C2 (the slider) moving along the elongated hole 10m, 20m in response to the relative rotation of, at least one of the first center plate 10 (the first rotary element) and the second center plate 20 (the second rotary element), and the control plate 40 (the fourth rotary element).

According to the configuration, because the change rate of the torque difference relative to the torsion angle may be relatively reduced by the specification of the inner coil spring 11 (the first elastic member), for example, the sound and vibration generated when the clearance between, for example, the first center plate 10 (the first rotary element) and, for example, a shaft fitted into the first center plate 10 (the first rotary element) is decreased may be further reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damper device, comprising:
   a first rotary element being rotatable about a rotary center;
   a second rotary element being rotatable about the rotary center;
   a third rotary element being rotatable about the rotary center;
   a first elastic member elastically expanding and contracting in response to a relative rotation of the first rotary element and the second rotary element;
   a first stopper being provided at the first rotary element and the second rotary element, the first stopper restricting the relative rotation of the first rotary element and the second rotary element by a contact thereof;
   a second elastic member elastically expanding and contracting in response to a relative rotation of the second rotary element and the third rotary element; and
   a second stopper being provided at the first rotary element and the third rotary element, the second stopper restricting the relative rotation of the first rotary element and the third rotary element by a contact thereof,
   wherein the second stopper is disposed radially outward of the rotary center relative to the first stopper.

2. The damper device according to claim 1, wherein
   the first rotary element includes a cylindrical portion and an arm extending radially outward from the cylindrical portion;
   the third rotary element includes an annular portion and a protrusion protruding radially inward from the annular portion; and
   the second stopper is provided at each of the arm of the first rotary element and the protrusion of the third rotary element.

3. The damper device according to claim 2, further comprising:
   a fourth rotary element being rotatable about the rotary center;
   a first sliding member sliding in a circumferential direction of the rotary center between, at least one of the first rotary element and the second rotary element, and the fourth rotary element;
   a second sliding member sliding in the circumferential direction between the third rotary element and the fourth rotary element; and
   a third stopper being provided at least at one of the first rotary element and the second rotary element, the third stopper being provided at the fourth rotary element, the third stopper restricting a relative rotation of, at least one of the first rotary element and the second rotary element, and the fourth rotary element by a contact thereof; wherein
   the third stopper includes
      an end portion in the circumferential direction, the end portion of an arc-shaped elongated hole that is along the circumferential direction, the arc-shaped elongated hole being provided at least at one of the first rotary element and the second rotary element; and
      a slider being inserted into the elongated hole, the slider moving along the elongated hole in response to the relative rotation of, at least one of the first rotary element and the second rotary element, and the fourth rotary element.

4. The damper device according to claim 1, further comprising:
   a fourth rotary element being rotatable about the rotary center;
   a first sliding member sliding in a circumferential direction of the rotary center between, at least one of the first rotary element and the second rotary element, and the fourth rotary element;
   a second sliding member sliding in the circumferential direction between the third rotary element and the fourth rotary element; and
   a third stopper being provided at least at one of the first rotary element and the second rotary element, the third stopper being provided at the fourth rotary element, the third stopper restricting a relative rotation of, at least one of the first rotary element and the second rotary element, and the fourth rotary element by a contact thereof; wherein the third stopper includes
- an end portion in the circumferential direction, the end portion of an arc-shaped elongated hole that is along the circumferential direction, the arc-shaped elongated hole being provided at least at one of the first rotary element and the second rotary element; and
- a slider being inserted into the elongated hole, the slider moving along the elongated hole in response to the relative rotation of, at least one of the first rotary element and the second rotary element, and the fourth rotary element.

5. A damper device, comprising:
a first rotary element being rotatable about a rotary center;
a second rotary element being rotatable about the rotary center;
a third rotary element being rotatable about the rotary center;
a first elastic member elastically expanding and contracting in response to a relative rotation of the first rotary element and the second rotary element;
a first stopper being provided at the first rotary element and the second rotary element, the first stopper restricting the relative rotation of the first rotary element and the second rotary element by a contact thereof;
a second elastic member elastically expanding and contracting in response to a relative rotation of the second rotary element and the third rotary element;
a second stopper being provided at the first rotary element and the third rotary element, the second stopper restricting the relative rotation of the first rotary element and the third rotary element by a contact thereof;
a fourth rotary element being rotatable about the rotary center;
a first sliding member sliding in a circumferential direction of the rotary center between, at least one of the first rotary element and the second rotary element, and the fourth rotary element;
a second sliding member sliding in the circumferential direction between the third rotary element and the fourth rotary element; and
a third stopper being provided at least at one of the first rotary element and the second rotary element, the third stopper being provided at the fourth rotary element, the third stopper restricting a relative rotation of, at least one of the first rotary element and the second rotary element, and the fourth rotary element by a contact thereof; wherein
the third stopper includes
- an end portion in the circumferential direction, the end portion of an arc-shaped elongated hole that is along the circumferential direction, the arc-shaped elongated hole being provided at least at one of the first rotary element and the second rotary element; and
- a slider being inserted into the elongated hole, the slider moving along the elongated hole in response to the relative rotation of, at least one of the first rotary element and the second rotary element, and the fourth rotary element.

* * * * *